United States Patent [19]

Gitelman

[11] Patent Number: 5,250,131

[45] Date of Patent: Oct. 5, 1993

[54] METHOD FOR RECOVERING METAL REINFORCEMENT FROM RUBBER TIRES

[76] Inventor: Alexandr I. Gitelman, Kostandi, 180, Odessa, U.S.S.R.

[21] Appl. No.: 824,099

[22] Filed: Jan. 22, 1992

Related U.S. Application Data

[63] Continuation of PCT/SU90/00073 filed Mar. 22, 1990.
[51] Int. Cl.$^5$ ............................................. B32B 35/00
[52] U.S. Cl. ..................................... 156/95; 156/344; 156/272.2; 29/403.4; 264/37
[58] Field of Search .............. 156/344, 584, 95, 272.2; 29/403.4; 264/37

[56] References Cited

U.S. PATENT DOCUMENTS

| | | | |
|---|---|---|---|
| 1,385,079 | 7/1921 | Jones | 156/344 X |
| 2,291,862 | 8/1942 | Bailey | 156/344 |

FOREIGN PATENT DOCUMENTS

| | | | |
|---|---|---|---|
| 2900655 | 7/1980 | Fed. Rep. of Germany | 264/37 |
| 1039735 | 9/1983 | U.S.S.R. | 156/95 |
| 1194687 | 11/1985 | U.S.S.R. | |

Primary Examiner—David A. Simmons
Assistant Examiner—Mark A. Osele
Attorney, Agent, or Firm—Keck, Mahin & Cate

[57] ABSTRACT

A method for recovering metal reinforcement from rubber tires involves placing a tire having metal reinforcement into a high-frequency electromagnetic field, heating the tire and separating the reinforcement from rubber. Lowering of power requirements and enlargement of capabilities are achieved by clamping the tire between rolls and subsequent heating of a local portion of the tire to a temperature of pyrolysis of rubber layers nearest to the reinforcement to form a pyrolysis swelling. The tire is then drawn between the rolls.

2 Claims, 1 Drawing Sheet

METHOD FOR RECOVERING METAL REINFORCEMENT FROM RUBBER TIRES

This is a continuation of application PCT/SU90/00073, filed Mar. 22, 1990.

FIELD OF THE INVENTION

The invention relates to processing of worn or rejected rubber articles, and more specifically, it deals with methods for recovering metal reinforcement from rubber tires. The invention may be used at regeneration and tire retreading plants and at rubber manufacturing plants.

STATE OF THE ART

Known in the art is a method for recovering metal reinforcement from rubber tires involving heating metal reinforcement to a temperature of fusion of the nearest rubber layers and separating the reinforcement from rubber (SU, A, 1039735).

In carrying out this method a tire being processed is clamped between power supply grippers before heating simultaneously with cutting with the grippers at outer and inner sides of its beads to expose metal reinforcement.

The disadvantage of the prior art method resides in high power requirements because of the need to heat to a temperature of rubber melting over the whole perimeter of reinforcement through the whole thickness of rubber, i.e., between metal reinforcement and the surface of the tire. In addition, the method is deficient because it requires a continuous line of metal reinforcement, i.e., this method is only suitable for recovering bead rings from the tires and cannot be used for recovering individual reinforcement members such as metal threads of the breaker so that the capabilities of this method are limited.

SUMMARY OF THE INVENTION

The invention is based on the problem of providing a method for recovering metal reinforcement from rubber tires, wherein a local heating only and subsequent indirect heating of the tire allow the capabilities of the method to be enlarged.

This problem is solved by the fact that in a method for recovering metal reinforcement from rubber tires, comprising placing a tire with metal reinforcement into a high-frequency electromagnetic field, heating and separating the reinforcement from rubber, according to the invention, a local portion of the tire is clamped between at least two pairs of pressure rolls, this portion is heated to a temperature of pyrolysis of rubber layers nearest to the reinforcement and until a pyrolysis swelling, with subsequent drawing of the tire between the rolls.

Heating only a local portion of metal reinforcement to a temperature of pyrolysis of rubber layers nearest thereto allows power requirements to be lowered and capabilities of the method to be enlarged in comparison with the state of the art method for the following reasons.

A pyrolysis swelling formed upon heating of a local portion functions as a thermomechanical tear between layers of metal reinforcement and rubber. The swelling is associated with metal reinforcement which functions as a heat conductor. Moving this thermomechanical tear along the whole circle of the tire allows indirect heating of the tire to be carried out without electric energy consumption, and heating can be performed of both individual reinforcement members (metal cord threads of the breaker) and continuous reinforcement (bead rings).

Drawing the tire between the rolls is preferably carried out by causing the tire to rotate with respect to the rolls to facilitate the process.

BRIEF DESCRIPTION OF THE DRAWINGS

The invention will now be described in detail with reference to the accompanying drawings illustrating a method for recovering reinforcement from rubber tires, in which.

PREFERRED EMBODIMENT OF THE INVENTION

Figure 1:
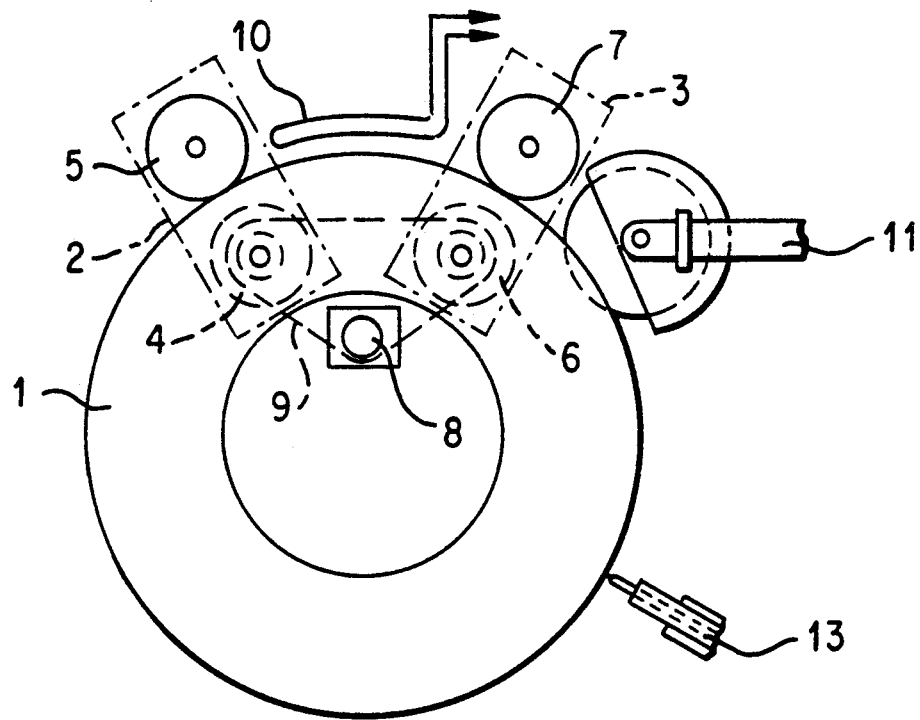
FIG. 1 schematically shows an apparatus for carrying out a method according to the invention.
Figure 2:
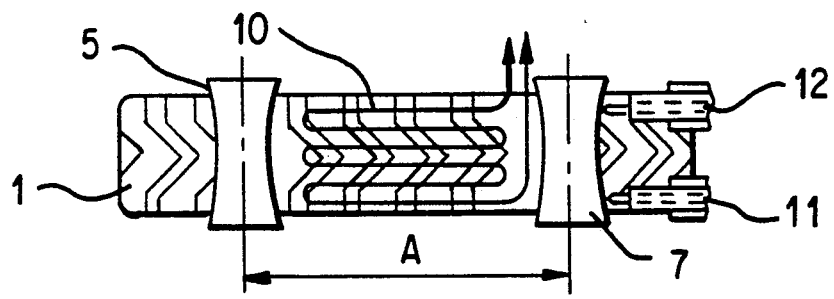
FIG. 2 schematically shows a top view of the apparatus shown in FIG. 1.

FIGS. 1 and 2 show a tire 1 which is processed in an apparatus for carrying out a method according to the invention. The apparatus has a mechanism for rotating tire 1 which consists of two pairs 2 and 3 of pressure rolls. Pair 2 of pressure rolls consists of a driven roll 4 and an idle roll 5 and pair 3 of pressure rolls consists of a driven roll 6 and an idle roll 7. Driven rolls 4 and 6 are connected to each other by means of a drive shaft 8 and a chain drive 9. An inductor 10 is provided between pairs 2 and 3 of driven rolls. The apparatus also has longitudinal circular knives 11 and 12 and a transverse circular knife 13 for subsequent cutting of a tire. It will be apparent to those skilled in the art that any other known device such as a milling cutter can also be used for the same purpose.

A method for recovering metal reinforcements from rubber tires, e.g., metal cord threads of a breaker is carried out in the following manner.

Figure 3:
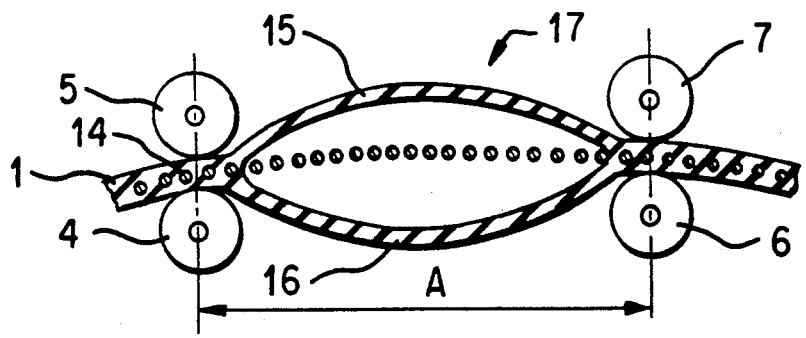
FIG. 3 shows a structure of a dismembered tire.

Tire 1 (FIGS. 1 and 2) is fixed between pairs 2 and 3 of pressure rolls ensuring reliable clamping of the tire and friction engagement therewith at the ends of a local portion A of the tire. The length of this portion depends on the tire size. In addition, pairs 2 and 3 of pressure rolls ensure sealing of the portion A along the line of contact with the tire. Inductor 10, which is installed immediately adjacent to the surface of the tread layer of the tire in the zone of the portion A, is then energized. Eddy currents are thus induced in a breaker 14 (FIG. 3) which consists of individual metal cord threads to heat the threads. High-frequency induction eddy currents mainly concentrate on the surface of the metal cord threads. Heating of rubber layers nearest to the breaker occurs from the surface of breaker 14 through heat transfer. During this heating metal cord threads are gradually separated from rubber of a tread 15 and carcass 16. The metal cord threads of breaker 14 are heated until rubber layers nearest thereto reach a temperature of pyrolysis (thermochemical decomposition into components with release of pyrolysis gases). This process occurs without air supply. Pyrolysis gas which is thus released forms a pyrolysis swelling 17 (bubble) between layers which finally strips breaker 14 off tread layer 15 and carcass layer 16. The above-mentioned pyrolysis swelling 17 gets the form of a cushion having its horizontal axis aligned with the baseline of breaker 14, the swelling being formed on either side of this line. Pyrolysis gas at high temperature (about 600° C.) is present in pyrolysis swelling 17, and withdrawal of thermal energy from the zone of pyrolysis swelling 17 occurs through metal cord threads (functioning like a heat conductor) in all directions away from the heated area (portion A) between pairs 2 and 3 of pressure rolls. The layers of rubber which cover the metal cord are mostly subjected to pyrolysis decomposition. This results in fusion of rubber layers which are nearest to the rubberized metal cord threads at a certain distance from the local portion A.

Inductor 10 is then deenergized; the mechanism for rotating tire 1 is turned on, and two pairs 2 and 3 of pressure rolls are used for positively rolling tire 1 between the rolls. Pyrolysis swelling 17 clamped between, and sealed by pairs 2 and 3 of rolls moves around tire 1 at a speed which ensures tear of softened rubber layer which are nearest to the metal parts. It will be apparent to those skilled in the art that the speed of rotation of tire 1 is so chosen as to have enough time for transmitting thermal energy through metal cord parts into zones outside the portion A. As a result of full revolution of tire 1 complete internal separation of the tire occurs into tread layer 15 and carcass layer 16. Longitudinal circular knives 11 and 12 are used to cut tire 1 along ring borders of the baseline of breaker 14. Tread layer 15, breaker 14 and carcass layer 16 which are no more bound to one another are then easily separated.

The bead rings and metal cord threads are removed from the tire.

The above-described method allows metal reinforcement to be recovered from rubber tires at a low cost.

INDUSTRIAL APPLICABILITY

The method for recovering metal reinforcement from rubber tires may be used for processing worn tires at regenerating and retreading plants and at rubber manufacturing plants.

What is claimed is:

1. A method for recovering metal reinforcement from rubber tires, comprising placing a tire having metal reinforcement into a high-frequency electromagnetic field, heating and separating the reinforcement from rubber, characterized by clamping a local portion of the tire between at least two pairs of pressure rolls, heating this portion to a temperature of pyrolysis of rubber layers nearest to the reinforcement and until a pyrolysis swelling is formed, with subsequent drawing of the tire between the rolls.

2. A method of claim 1, characterized by the fact that the tire is drawn between the rolls by causing the tire to rotate with respect to the rolls.

* * * * *